United States Patent Office 3,563,968
Patented Feb. 16, 1971

3,563,968
PROCESS FOR THE PREPARATION OF FUNCTIONAL POLYMERS FROM N-VINYL PYRROLIDONE
Ashot Merijan, Wayne, Eugene S. Barabas, Watchung, and Marvin M. Fein, Westfield, N.J., assignors to GAF Corporation, New York, N.Y., a corporation of Delaware
No Drawing. Continuation-in-part of application Ser. No. 672,449, Oct. 3, 1967. This application Feb. 9, 1970, Ser. No. 10,024
Int. Cl. C08f 7/12
U.S. Cl. 260—88.3                                    2 Claims

ABSTRACT OF THE DISCLOSURE

Functional homopolymers of heterocyclic N-vinyl monomers are obtained by the simultaneous polymerization and aminoalkylation or hydroxyalkylation of N-vinyl pyrrolidone.

RELATED PATENTS

This application is a continuation-in-part of U.S. Pat. application Ser. No. 672,449 filed Oct. 3, 1967, and now U.S. Pat. No. 3,494,907 issued Feb. 10, 1970.

SUMMARY OF THE INVENTION

The amino- or hydroxy-alkylated polyemers of this invention are readily obtained by reacting 1 mole of the N-vinyl pyrrolidone monomer with 0.01 to 2.0 moles of an α-olefinic alcohol or α-olefinic amine in solution of an inert organic solvent common to the monomer and the α-olefinic alcohol or the α-olefinic amine and in the presence of 0.03 to 0.5 mole of an organic peroxide catalyst per mole of α-olefinic alcohol or α-olefinic amine, at a temperature from about 80° C. to about 200° C. for a period of time ranging from about 3 to about 20 hours.

DESCRIPTION OF INVENTION

We have found that polymers of heterocyclic N-vinyl monomers are readily aminoalkylated or hydroxyalkylated by reacting 1 mole of N-vinyl pyrrolidone monomer with 0.01 to 2.0 moles of an α-olefinic alcohol such as allyl alcohol, 3-buten-1-ol, 4-penten-1-ol, 5-hexen-1-ol, 5-hexen-2-ol, and the like, or with an α-olefinic amine such as allylamine, 1-amino-3-butene, 1-amino-4-pentene, 2-amino-4-pentene, 1-amino-5-hexene, and the like in a solution of an organic solvent diluent common to the N-vinyl pyrrolidone, and said alcohol and said amine, in the presence of 0.03 to 0.5 mole of an organic peroxide catalyst per mole of said alcohol or said amine at a temperature ranging from about 80° C. to about 200° C. for a period of time ranging from about 3 to about 20 hours.

The foregoing α-olefinic alcohols and amines as well as the monomer are readily obtained by procedures described in the chemical literature.

It is to be noted that any α-olefinic alcohol or amine may be employed, regardless of the carbon chain length, so long as it contains an ethylenic unsaturation in alpha position.

The organic solvent diluent may be removed from the reaction by vacuum distillation or the solution of the aminoalkylated or hydroxyalkylated polymer may be employed as such. The aminoalkylated or hydroxyalkylated polymer may also be removed from the reaction by precipitation with petroleum ether and the reaction product washed with petroleum ether and dried in a vacuum oven.

When N-vinyl pyrrolidone monomer is simultaneously polymerized and either hydroxyalkylated or aminoalkylated in accordance with the foregoing reaction, resulting polymeric product (functional homopolymer) will contain from 0.01 to 2.0 milliequivalents per gram of product of hydroxyalkyl or aminoalkyl groups directly attached to the carbon atom alpha to the carbonyl. A small amount of α-olefinic alcohol or amine will also copolymerize with the heterocyclic N-vinyl monomer, yielding a copolymer wherein 1 mole of the aminoalkyl or the hydroxyalkyl group is in the backbone per 50 to 1000 moles of N-vinyl monomer pyrrolidone constituting the aminealkylated or hydroxyalkylated polymer. The average molecular weights of such copolymers will vary from 1000 to as high as 1,000,000.

It is the presence of the hydroxyalkyl or the aminoalkyl groups in the polymers prepared in accordance with the foregoing reaction of this invention that lends such polymers to further reactions such as cross-linking with maleic anhydride and the like to yield a new and useful class of polymeric resins.

As the organic solvent which is common to the N-vinyl pyrrolidone employed in the reaction with α-olefinic alcohols and α-olefinic amines, various alcohols, such as methanol, ethanol, propanol, isopropanol, butanol, sec-butanol, amyl alcohol, hexanol, 2-ethyl-1-hexanol, ethylene glycol, 1,2-butanediol, 4-butanediol, etc., may be employed. Other non-reactive solvents such as diethylene glycol, ethylene glycol monomethyl ether and the like may also be employed. It is to be noted that the nature or character of the organic solvent is immaterial so long as it forms a solution with N-vinyl pyrrolidone, the monomer; and a solution of the α-olefinic alcohol or amine and does not enter into the reaction to any measurable extent.

As peroxide catalysts (initiators) for the reaction of of the N-vinyl pyrrolidone and the α-olefinic alcohol or amine under the foregoing reaction conditions, any one of the known tertiary-alkyl organic peroxides and hydroperoxides such as, for example, di-t-butyl peroxide, t-butyl perbenzoate, di-t-butyl perphthalate, t-butyl pentamethyl-ethyl peroxide, t-butyl - triphenylmethyl peroxide, di-t-amyl peroxide, bis - (triethylmethyl) peroxide, bis-(triphenylmethyl) peroxide, 2,5 - dimethylhexyl - 2,5-dihydroperoxide, 2,5 - dimethyl-2,5-di (t-butyl peroxy) hexane, 2,5 - dimethylhexyl-2,5-di (peroxy benzoate), t-butyl hydroperoxide, para-menthane hydroperoxide and the like may be used.

When N-vinyl pyrrolidone is reacted with the α-olefinic alcohol or amine, the reaction may be carried out either at reflux or in a stainless steel shaker bomb. A solution of the N-vinyl pyrrolidone and the α-olefinic amine or alcohol in the organic solvent and peroxide catalyst in the proportions aforestated is heated at reflux or charged to the bomb and purged with nitrogen and sealed. The bomb is then heated and maintained at the same temperature and for the same period of time as noted above.

The pressure developed in the bomb may range from 10 to about 500 p.s.i.g. After cooling the contents of the bomb to room temperature, they are discharged and the aminoalkylated or hydroxyalkylated addition polymer is recovered from the solution by precipitation by petroleum ether, washing once or twice with petroleum ether and drying the product in a vacuum oven for about 5–10 hours. Instead of precipitation with petroleum ether, the contents of the bomb may be cooled to room temperature and discharged into any suitable distillation equipment to remove the solvent and the product dried in any conventional manner, preferably in a vacuum oven.

When 1 mole of N-vinyl pyrrolidone monomer is reacted with 0.01 to 2.0 moles of either α-olefinic alcohol or amine under the foregoing reaction conditions, the resulting polymeric product will contain from 0.01 to 2.0 milliequivalents of amine or hydroxy functionality per gram of the polymeric production or from 0.1 to 20.0 mole percent of reacted α-olefinic amine or α-olefinic alcohol in the polymeric product.

A small amount of α-olefinic alcohol or amine may also copolymerize with the heterocyclic N-vinyl monomer, yielding a copolymer wherein 1 mole of the aminoalkyl or the hydroxyalkyl group is in the backbone per 50 to 1000 moles of heterocyclic N-vinyl pyrrolidone moieties constituting the aminoalkylated or hydroxyalkylated polymer. In addition to the presence of the aminoalkyl or hydroxyalkyl group in the backbone of the polymer, the monomer moieties of the N-vinyl pyrrolidone monomers will contain aminoalkyl or hydroxyalkyl groups directly attached to the moieties. The aminoalkylation or hydroxyalkylation takes place on the carbon atom alpha to the carbonyl group and also on the carbon atom alpha to the nitrogen if such carbon atom does not contain a lower alkyl substituent.

The aminoalkylated and hydroxyalkylated polymers prepared in accordance with the present invention are useful in the preparation of various curable coatings having good water and organic solvent resistance. They are also useful as complexing agents for metals and phenolic compounds.

The following examples will show how the functional polymers of N-vinyl pyrrolidone monomer are prepared. All parts given are by weight unless otherwise noted.

EXAMPLE I

A 1-liter stainless steel shaker bomb was charged with a solution of the following ingredients:

N-vinyl pyrrolidone: 222.0 grams (2.0 moles)
Allyl amine: 25.0 grams (0.44 mole)
Ethanol: 300.0 grams (solvent)
Di-t-butyl peroxide: 15.0 grams (1.11 mole)

The bomb was then purged with nitrogen and sealed. It was heated with shaking and the contents were maintained at 130° C.–140° C. for sixteen (16) hours. After cooling and venting, the contents of the bomb (viscous yellow solution) were removed. The product was precipitated by addition of the reaction mixture into a beaker containing 1500 milliliters of petroleum ether. The precipitate was then washed twice with 1000-milliliter portions of petroleum ether. The final percipitate was placed in stainless steel trays and dried in vacuum oven at 100° C.–110° C. for about two (2) days. The dried product, light yellow brittle solid, thus obtained weighed 218.0 grams of 99.71% solids. Its relative viscosity (water) was 1.138. In aqueous titration with a standard HCl solution down to pH 4.4 (its end point obtained by pH vs. volume studies), the product was found to be of 0.94 milliequivalent amine functionality per gram of the polymer, corresponding to 9.85 mole percent of reacted allyl amine in the product.

EXAMPLE II

A charge of 323.0 grams of isopropanol, 215.4 grams of N-vinyl pyrrolidone, 46.4 grams of allyl alcohol and 15.0 grams of di-t-butylperoxide was placed in a 1100 milliliter stainless steel rocking bomb. The bomb was purged, closed and heated to 130° C.–140° C. The temperature was held for sixteen (16) hours. The bomb was cooled to 50° C. and the material was discharged.

The solvent was removed by vacuum distillation at 3 millimeters and 43° C. Analysis: Solids, 98.7%; OH number: 56.96, corresponding to 101 milliequivalent of hydroxy per gram of polymer or 10.5 mole percent reacted allyl alcohol in the product.

EXAMPLE III

Example II was repeated with the exception that 10.0 grams of 5-hexen-1-ol was used rather than the allyl alcohol. The product was a yellow solid exhibiting characteristic —OH, and amide C—O bands in the IR. The hydroxyl number was 64.8, corresponding to 1.15 milliequivalent of hydroxy per gram of product, or 12.6 mole percent of reacted 5-hexen-1-ol in the product.

EXAMPLE IV

Example I was repeated with the exception that the allyl amine was replaced by 71.0 grams (1.0 mole) of 1-amino-3-butene.

After titration of the dry product with standard aqueous HCl down to a pH of 4.4, the product showed 1.26 milliequivalents of amine functionality per gram of the polymer, corresponding to 13.7 mole percent of reacted 1-amino-3-butene in the product.

We claim:
1. The process of preparing aminoalkylated and hydroxyalkylated addition N-vinyl pyrrolidone homopolymers which comprises reacting 1 mole of the monomer, N-vinyl pyrrolidone, with 0.01 to 2 moles of a member of the group consisting of α-olefinic alcohols and α-olefinic amines in a solution of an organic solvent common to said reactants and in the presence of 0.03 to 0.5 mole of an organic peroxide per mole of said alcohol or amine.

2. The process according to claim 1 wherein the reaction is promoted by temperatures ranging from 80° C. to about 200° C. for a period of time ranging from 3 to about 20 hours.

References Cited
UNITED STATES PATENTS

| | | | |
|---|---|---|---|
| 2,667,473 | 1/1954 | Morner et al. | 260—88.3L |
| 2,695,278 | 11/1954 | Justice | 260—88.3L |
| 2,818,362 | 12/1957 | Drechsel | 260—88.3L |
| 2,941,980 | 6/1960 | Robinson | 260—88.3L |

HARRY WONG Jr., Primary Examiner

U.S. Cl. X.R.

260—33.4, 47, 78.4, 78.5, 80.3